Figure 1:
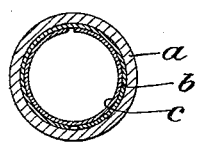

(No Model.)

W. T. RUETE.
PIPE AND MODE OF LINING SAME.

No. 535,998. Patented Mar. 19, 1895.

Witnesses:
Robt. F. Gaylord
James W. Catlow

Inventor:
William T. Ruete,
by Duncan & Page,
Attorneys

UNITED STATES PATENT OFFICE.

WILLIAM T. RUETE, OF NEW YORK, N. Y.

PIPE AND MODE OF LINING SAME.

SPECIFICATION forming part of Letters Patent No. 535,998, dated March 19, 1895.

Application filed December 18, 1894. Serial No. 532,143. (No model.)

*To all whom it may concern:*

Be it known that I, WILLIAM T. RUETE, a citizen of the United States, residing in the city of New York, in the State of New York, have invented a new and useful Improvement in Pipes and Modes of Lining the Same; and I declare that the following is a description of the said invention.

The invention relates to the lining of pipe or tubing, for the purpose of insulating its inner surface where the pipe is to be put to electrical uses; and for the purpose of protecting the interior from corrosive action when the pipe is to be used as a conduit for water or other fluids.

Various modes of lining metal pipe for the above purposes have heretofore been used. Sometimes the pipe has been lined with porcelain, or with glass, and sometimes with block tin; but these methods of insulating or protecting the inner surface of the pipe are necessarily expensive, and therefore the adoption of such modes is limited. Another mode has been to introduce into the metal pipe an inner tube of some fibrous material. For this purpose a paper tube was prepared and after being treated with some hydro-carbon compound, or other suitable insulating material, it was pushed endwise into the metal pipe. In order to fill up the annular space between the pipe and the lining, and secure the proper adhesion of the two, the lining tube was coated with a cement before it was inserted in the pipe; and in order to prevent the undue chilling of this cement the metal pipe had to be highly heated before the paper tube was inserted. One of the recognized difficulties inherent in this mode of manufacture was that, even when the metal pipe was highly heated, the cement would not be uniformly distributed. The cement would be forced back as the lining advanced, so that when the lining was at last in place there would be a scarcity of cement at the leading end of the lining tube and a surplus at the other end. Another and the chief difficulty was that much stiffness and strength were required to enable the lining tube to stand up while being inserted, and to this end it was necessary to make the lining tube heavy and thick, much more so than was necessary for mere purposes of insulation. This of course involved expense and diminished the net available space in the metal pipe. The difficulty of introducing the previously prepared paper tube was such that comparatively short lengths only could be used; and the necessity of cutting the pipe to short lengths, and the cutting of the additional coupling threads rendered necessary by the use of short lengths, materially increased the expense.

As compared with these older methods of manufacture, I propose to produce lined tubing by taking flat strips of the lining material and drawing them into the pipes to be lined. These strips may be coated with some adhesive material before entering the pipe, and after being drawn in may be expanded, by the use of any suitable tool, against the interior of the pipe; after which, if desired, the pipe, with its lining now in place, may be dipped in a hot bath of paraffinic bitumen or asphaltum paint, or any of the hydro-carbon preparations used for similar purposes. The paper or other fibrous strips may be drawn into the pipe by binding the leading end of the strip or strips around the end of a cylindrical rod which is then passed through the pipe. The form of the rod gives the preliminary curvature to the leading end of the strip, which then becomes bent to conform to the interior of the pipe throughout its whole extent as it is drawn forward. A single strip may be used of a width just equal to the internal circumference of the pipe; or, if preferred, two or more strips may be used, the one overlying the other, and in this case the several strips preferably are to be so arranged as to break joints. After the strip or strips have been introduced into the pipe, they may readily be expanded into close contact with the pipe by passing through the pipe a rod armed with a flexible and elastic brush, or a hollow elastic ball, of such diameter as to pass readily through the bore of the pipe and at the same time press all parts of the strip outwardly against the inner wall of the pipe.

As above indicated, after the lining strips have been put in place, the whole may be dipped in a hot bath of asphaltum paint or coke pitch, or any equivalent material adapted to improve the insulating quality of the lined pipe or to increase the durability of the lining.

In the accompanying drawings Figure 1 is a cross-section of a pipe which has been lined by my method; in which *a* represents the metal pipe, and *b* and *c* a two-ply paper lining.

Figure 2:
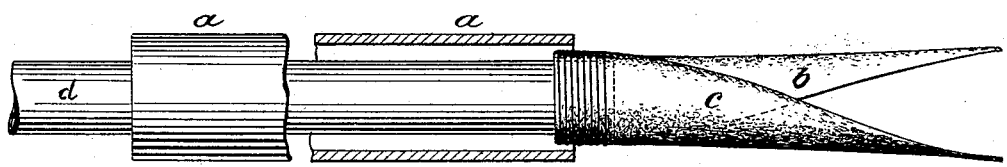

In Fig. 2 is shown a method of introducing the paper strips into the pipe; in which *a* represents the metal pipe, partly in elevation and partly in section. *b* and *c* are the strips of paper, and *d* is a rod around which the leading ends of the paper strips are bound.

Figure 3:
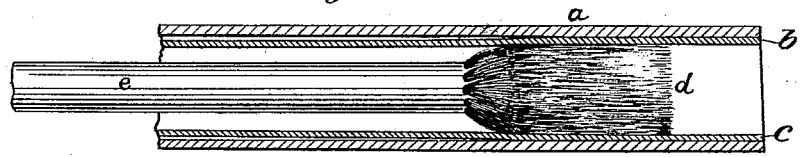

In Fig. 3 is shown a brush such as may be used for expanding the paper strips against the inner wall of the pipe. In this figure *a* represents the pipe in section; *b c*, the paper strips; and *d* the brush attached to the end of the rod *e*.

The advantages of the above described mode of lining pipe are various. A much thinner lining can be used than would be possible by the old method of introducing a previously prepared paper tube, and the thickness of the lining can readily be adjusted, by the use of one or more plies, to any requirement. The work can be carried on with great facility. It is unnecessary that the pipe be cut too short, or in fact to any definite lengths. The improved method is applicable with equal facility to pipes of any length. The lining also can be secured in more intimate and uniform contact with the walls of the pipe than by the former method. Thus a notable economy is effected in the manufacture, and a superior article is produced.

I do not propose to claim herein any particular mechanism for the manufacture of lined pipe by my improved method, as this will be made the subject of a special application for patent; but

What I claim herein is—

1. The hereinbefore described improvement in the art of lining pipe, which consists in preparing the lining material in the form of a flat strip or strips and introducing the same by an endwise movement into the pipe, the lining strip or strips being curved into the cylindrical shape, to conform to the shape of the pipe, by the act of inserting them in the pipe.

2. The improvement in the art of lining pipe, which consists in introducing one or more strips of lining material into the pipe by an endwise movement, and then expanding such strip or strips against the inner wall of the pipe by some expanding tool which is passed through the pipe.

3. The improvement in the manufacture of lined pipe, which consists in coating with paste or cement one or more lining strips, introducing such strip or strips into the pipe, expanding them against the inner walls of the pipe, and then dipping the lined pipe in asphaltum paint or other equivalent material for improving the insulating quality of the lining or increasing its durability, substantially as described.

4. The hereinbefore described improved article of manufacture, consisting of a metal pipe lined with one or more strips of paper or other fibrous material introduced lengthwise into the pipe and expanded into close contact with the inner surface of the same.

5. The hereinbefore described article of manufacture, which consists of a metal pipe lined with one or more strips of paper or other fibrous material introduced lengthwise into the pipe and then cured by immersion in a bath of insulating or other equivalent material.

WM. T. RUETE.

Witnesses:
 ROBT. F. GAYLORD,
 JAMES N. CATLOW.